(12) United States Patent
Stoudt et al.

(10) Patent No.: US 8,939,361 B2
(45) Date of Patent: Jan. 27, 2015

(54) SYSTEMS AND METHODS FOR TARGETED POINT-OF-SALE CONTENT DELIVERY

(71) Applicant: Outcast Media, Inc., Santa Monica, CA (US)

(72) Inventors: Matthew John Stoudt, Santa Monica, CA (US); Nathan Frederic Gill, New York, NY (US); Sean Michael Lyden, Hermosa Beach, CA (US); Eric William Heatzig, Boca Raton, FL (US); Oliver Roger Koechli, Santa Monica, CA (US); Daniel R. Trotzer, Greenwich, CT (US)

(*) Notice: Subject to any disclaimer, the term of this patent is extended or adjusted under 35 U.S.C. 154(b) by 0 days.

(21) Appl. No.: 13/829,516

(22) Filed: Mar. 14, 2013

(65) Prior Publication Data

US 2013/0264385 A1  Oct. 10, 2013

Related U.S. Application Data

(60) Provisional application No. 61/683,841, filed on Aug. 16, 2012, provisional application No. 61/621,816, filed on Apr. 9, 2012.

(51) Int. Cl.
*G06Q 20/34* (2012.01)
*G06Q 20/12* (2012.01)
*G06Q 20/20* (2012.01)
*G06Q 20/38* (2012.01)

(52) U.S. Cl.
CPC .............. *G06Q 20/34* (2013.01); *G06Q 20/123* (2013.01); *G06Q 20/20* (2013.01); *G06Q 20/387* (2013.01)
USPC ....................................... 235/380; 705/14.42

(58) Field of Classification Search
USPC ....................................... 235/380; 705/14.42
See application file for complete search history.

(56) References Cited

U.S. PATENT DOCUMENTS

| | | | |
|---|---|---|---|
| 4,648,123 A * | 3/1987 | Schrock | 455/67.14 |
| 6,450,407 B1 | 9/2002 | Freeman et al. | |
| 6,869,013 B2 | 3/2005 | Allen et al. | |
| 7,162,451 B2 * | 1/2007 | Berger et al. | 705/51 |
| 7,356,477 B1 | 4/2008 | Allan et al. | |
| 7,841,514 B2 * | 11/2010 | Mueller et al. | 235/378 |
| 2003/0065576 A1 | 4/2003 | Harris | |
| 2004/0049425 A1 | 3/2004 | Bakker et al. | |
| 2005/0127796 A1 | 6/2005 | Olesen et al. | |
| 2006/0065719 A1 * | 3/2006 | Doyle | 235/382 |
| 2006/0287925 A1 | 12/2006 | Taylor et al. | |
| 2007/0132660 A1 | 6/2007 | Nuttall | |
| 2008/0040219 A1 | 2/2008 | Kim | |
| 2010/0049585 A1 * | 2/2010 | McIntyre et al. | 705/10 |
| 2010/0145792 A1 * | 6/2010 | Worthen et al. | 705/14.42 |
| 2010/0306069 A1 | 12/2010 | Austin et al. | |
| 2011/0031311 A1 | 2/2011 | Bakker | |
| 2011/0039616 A1 | 2/2011 | Bakker | |
| 2012/0046976 A1 | 2/2012 | Rourk | |

FOREIGN PATENT DOCUMENTS

| | | |
|---|---|---|
| WO | WO 93/16443 | 8/1993 |
| WO | WO 01/41033 | 6/2001 |

OTHER PUBLICATIONS

International Search Report for International Application No. PCT/US2011/025530 dated Apr. 27, 2011.

* cited by examiner

*Primary Examiner* — Allyson Trail

(57) ABSTRACT

Systems and methods of presenting targeted content to consumers at a point of sale using a customer profile derived at least in part from consumer credit or debit card information transmitted from the point of sale.

8 Claims, 13 Drawing Sheets

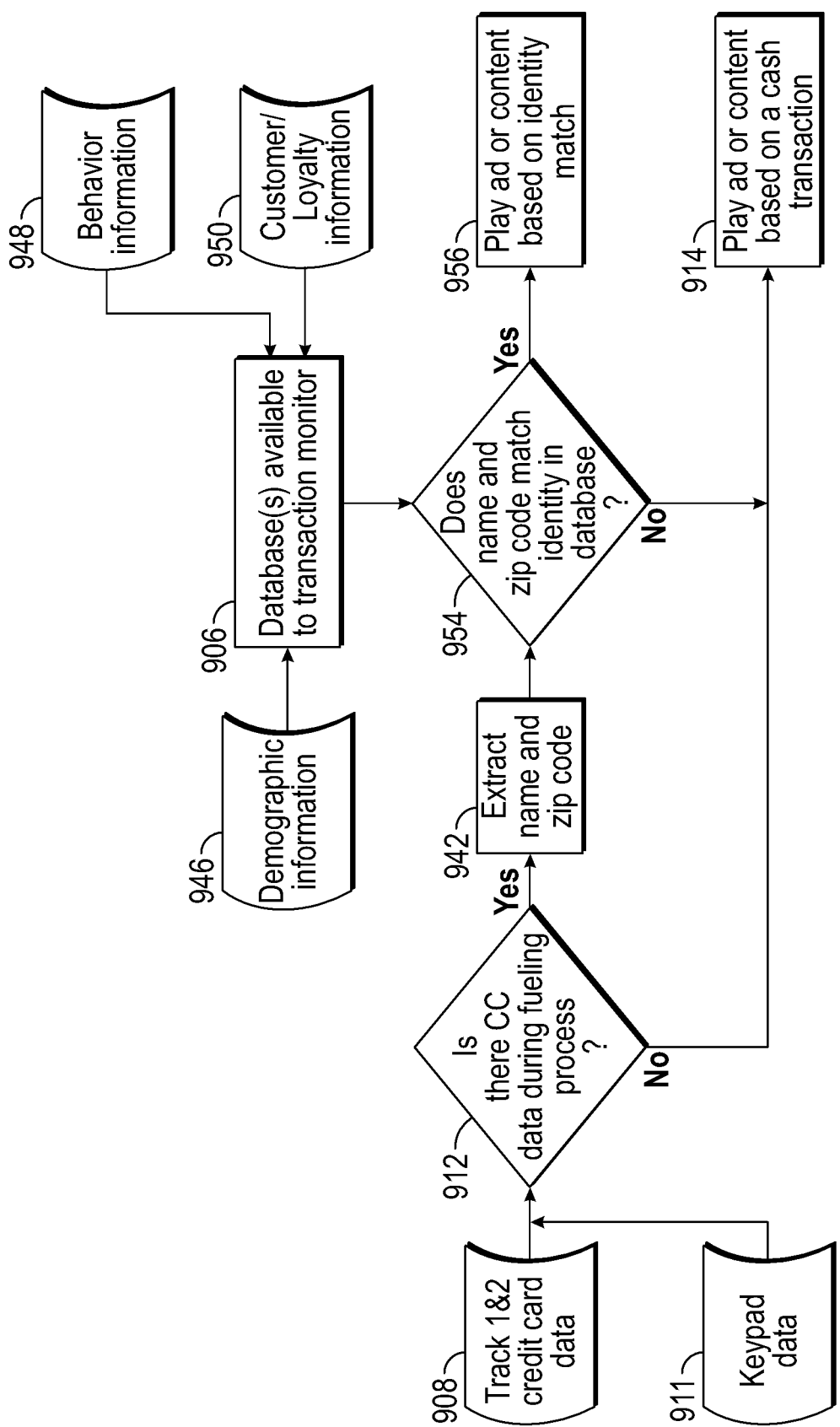

SYSTEMS AND METHODS FOR TARGETED POINT-OF-SALE CONTENT DELIVERY

CROSS-REFERENCE TO RELATED APPLICATIONS

This application claims a priority benefit under 35 U.S.C. §119(e) from provisional Application No. 61/621,816, filed Apr. 9, 2012. This application also claims a priority benefit under 35 U.S.C. §119(e) from provisional Application No. 61/683,841, filed Aug. 16, 2012. The disclosures of the above-referenced applications are hereby expressly incorporated by reference in their entireties. Any and all priority claims identified in the Application Data Sheet, or any correction thereto, are hereby incorporated by reference under 37 CFR 1.57.

BACKGROUND OF THE INVENTION

1. Field of the Invention

The present invention relates to the field of targeted point-of-sale content delivery systems and methods.

2. Description of the Related Art

As consumers increase their use of electronic payment forms, point-of-sale systems featuring readers for these electronic payment forms enjoy increased presence in the marketplace. One enhancement of these systems has been the implementation of advertising and entertainment displays at or near the point of sale. For example, at many gas stations across the United States, a network of screens are now being operated at the gas pumps. Each gas pump has an audio/video player and screen. The screens play content, some of which may be advertisements, that begins early in the refueling process, for example, when the consumer lifts the gas pump handle. Examples of pump systems are described in U.S. Patent Publication 2005-0127796A1 entitled "Audio/Video Display Equipment for Gas Pumps," Which publication is hereby incorporated by reference in its entirety.

While the publication generally describes audio/video display equipment, improvements in this system are desirable.

SUMMARY OF THE INVENTION

The systems, methods, and devices of the disclosure each have several innovative aspects, no single one of which is solely responsible for the desirable attributes disclosed herein.

In one implementation, the invention comprises a content display system located proximate to a debit or credit card reader. The system may comprise a transaction monitor configured to obtain name information derived from customer use of a debit or credit card at the debit or credit card reader. A display may be configured to display content based at least in part on the name information.

One innovative aspect can be implemented in a content display system located proximate to a debit or credit card reader comprising means for obtaining name information derived from customer use of a debit or credit at the debit or credit card reader. Means for displaying content can display content based at least in part on the name information.

Another innovative aspect can include a computer readable, non-transitory medium storing instructions that when executed cause a computer system to obtain name information from customer use of a debit or credit card at a debit or credit card reader located proximate to a display system, generate a customer profile based at least in part on the name information, and display content based at least in part on the customer profile.

Another innovative aspect of the subject matter described in this disclosure can be implemented in a method of delivering content in a display system located proximate to a debit or credit card reader. The method comprises obtaining name information from customer use of a debit or credit card at the debit or credit card reader, generating a customer profile based at least in part on the name information, and displaying content based at least in part on the customer profile.

Another innovative aspect of the subject matter described in this disclosure can be implemented in a device for targeting content at a point of sale. The device includes a card reader, a transaction monitor having an input coupled with a card reader and an output coupled with a point-of-sale system, the transaction monitor configured to receive transaction information from at least one of the card reader and the point-of-sale system, and a transmitter configured to transmit the transaction information to a display for targeted content presentation.

Details of one or more implementations of the subject matter described in this specification are set forth in the accompanying drawings and the description below. Other features, aspects, and advantages will become apparent from the description, drawings, and claims. Note that the relative dimensions of the following figures may not be drawn to scale.

BRIEF DESCRIPTION OF THE DRAWINGS

FIG. 9B shows a flow diagram for the operation of the system in another specific implementation of using name information to characterize a customer.

DETAILED DESCRIPTION

Automated point of sale systems can be impersonal transaction processing devices, even when they are coupled to content display systems as described above, as current systems provide a one-way path to display messages to customers. Each customer is essentially the same as the next. Each customer views the same message.

Because separate players at each point of sale can be triggered by the presence or activity of each consumer, the inventors have found it possible to create a content presentation that can be made different for different customers. With current installations of point of sale content display systems, no attempt has been made to determine or acquire information about individual purchasers at the point of sale location which would allow selective display of content elements that are more likely to be of interest to the individual currently at the point of sale. However, because most purchases are authorized in advance using a credit or debit card (e.g., gas purchased at a pump), the inventors have realized that information about consumers paying by credit/debit cards can be obtained before the start of or during the content display. If a system were devised that utilized this information to produce a profile of the customer at or near the start of the transaction process (e.g., near the start of refueling), content targeted to their demographic, purchase habits, etc., would be possible.

From an advertising perspective, this may allow content (e.g., advertisements) tailored to the particular customer to be presented. This provides a unique opportunity for companies to engage with customers who may be interested in their message or to target those who have yet to discover their offerings.

From the perspective of the point of sale, providing content, such as entertainment or news, tailored to the particular customer may enhance the customer experience. Providing such positive associations can improve customer loyalty.

Figure 1A:
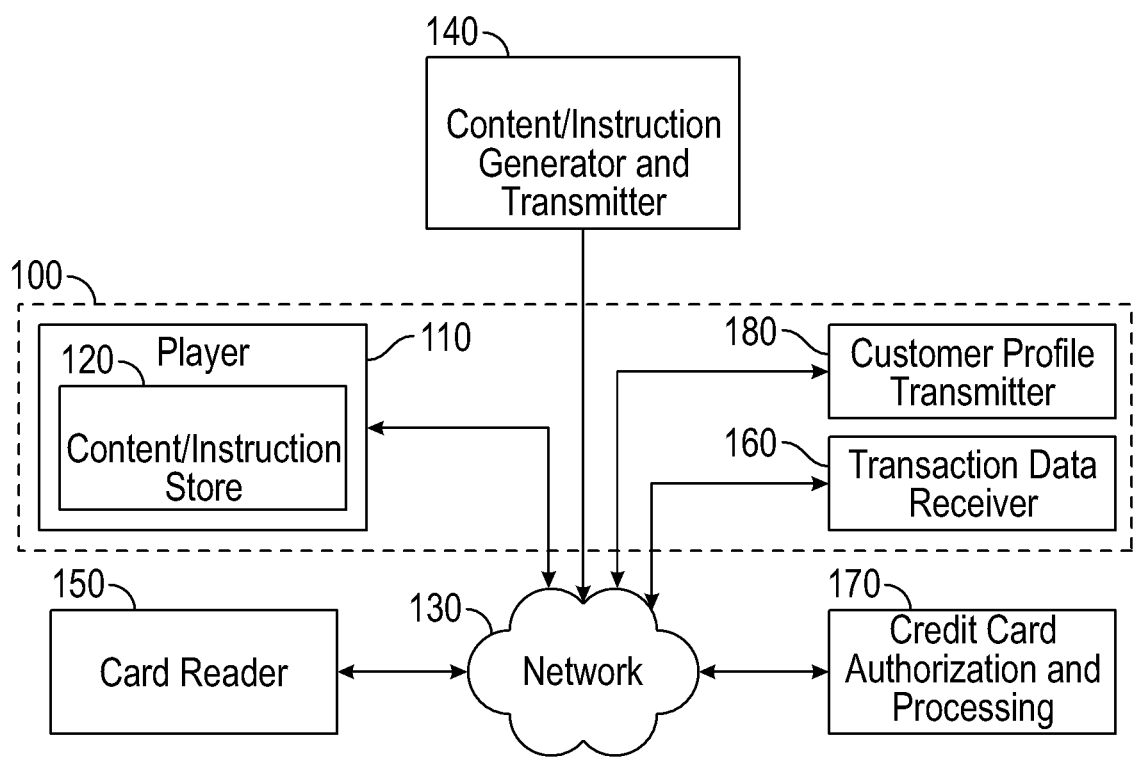
FIG. 1A shows a block diagram of an implementation of a targeted point-of-sale content delivery system according to an implementation of the invention.

FIG. 1A shows a block diagram of an implementation of a targeted point-of-sale advertisement system according to an embodiment of the invention. The system 100 comprises a player 110, a transaction data receiver 160, and a customer profile transmitter 180.

According to the example implementation shown, the player 110 may be configured to receive transmitted customer profile information and to display content based at least in part on the transmitted customer profile as described further below. The player 110 may be coupled to a network and may comprise, for example, a visual presentation element, an audio presentation element, a processor, and an input means. The player 110 may comprise or be coupled to a storage means 120. The storage means 120 can store content. The storage means 120 can also store instructions for presenting content. According to the example shown, content and instructions can be generated and transmitted to the player from an content/instruction generator and transmitter 140. Thus, via a network 130, the player 110 can receive content and/or instructions. The content and/or instructions can be stored in the storage means 120.

The system 100 may comprise one or more players 110. The system 100 may use a content management and distribution application (not shown) to create, schedule and traffic content to the player 110. Programming instructions and content can be scheduled as jobs within this application. Jobs can be disseminated to each player 110 in the system 100 in advance of their scheduled play periods via, for example, one or more of DSL, satellite and cellular technologies over network 130. One network implemented system to distribute multimedia jobs to players in a gas station environment is described in U.S. Patent Publication 2007/0132660 entitled System and Method for Media Distribution and Display, which is incorporated by reference herein in its entirety.

Each player 110 in the system 100 can store job instructions detailing what content elements are to play and the order in which they should play. Software on each player 110 can render and display content in based, at least in part, on instructions provided within the job. Jobs which comprise multiple content elements may be trafficked across the network instructing players 110 to insert specific content into the presentation based on the value or status of a variable which will be provided at a later date. In advantageous implementations, one or more of these variables is a customer profile that is produced and/or retrieved, and then sent to the player soon after the purchase transaction.

For example, a consumer card swipe at a card reader 150 can trigger the process of determining a customer profile, which is composed and delivered to the applicable player 110 in real-time or close to real-time. At the point the player 110 receives the customer profile, the job will reconcile the customer profile to the appropriate asset instructions and insert or select the appropriate content for the player 110 to display. If customer profile information is generated by a third party, it can be sent directly from the third party 170 (e.g., credit card issuer) to the player 110 or it can be routed via a different data center (e.g., the customer profile transmitter). The customer profiles may be stored in a database. The database can be polled by the networked players 110 when the customer starts the gas pumping process and the variables fetched accordingly. According to an example implementation, the system 100 matches transaction data with customer profile information so that content control variables are delivered to and processed by the appropriate player 110.

Figure 1B:
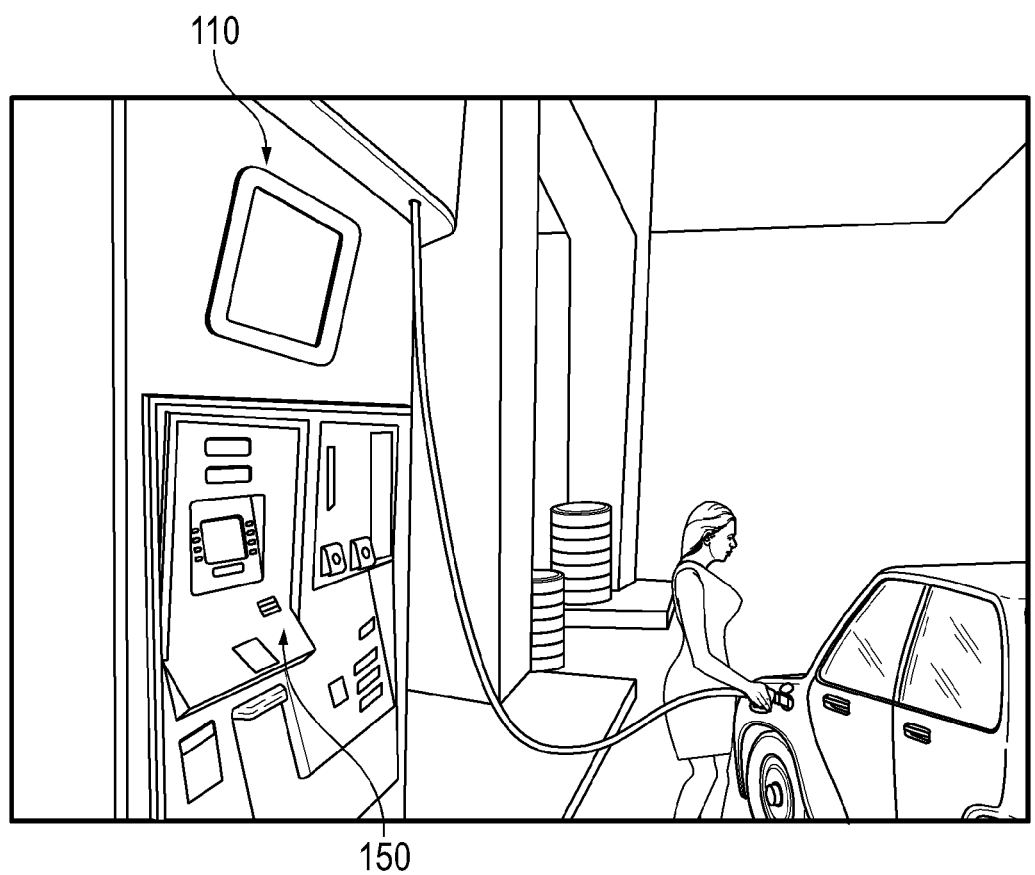
FIG. 1B is a front view of a gas pump display according to an implementation of the invention.

According to an implementation of the system 100, the content can be multimedia content. Images, sounds, and combinations of the two may be presented to the customer to provide a content experience tailored to the customer at the player 110. FIG. 1B is a front view of a gas pump display according to one implementation of the invention. As shown in this example, the player 110 can be integrated into the dispensing station which also may include a card reader 150. As the customer waits, the player presents the selected content tailored to the customer. As shown in FIG. 1B, the player 110 is located atop the dispensing station. In some implementations, the player 110 may be integrated into another portion of the dispensing station or located near (e.g., along side) the dispensing station.

Once the player 110 receives the customer profile information, the customer profile information is processed according to one or more rules to determine which content to present to the customer. For example, if the customer profile information indicates the customer is a Visa card-holder, a rule in the player may select appropriate content for this customer (e.g., an advertisement promoting a discount for using a Visa card at a particular vendor). As described in greater detail below, data for generating a customer profile is first gathered from the credit or debit card transaction. This data is used to prepare the customer profile, and the customer profile is then sent to the player.

FIG. 1A shows a transaction data receiver 160 that may be utilized to perform some of these functions. The transaction data receiver 160 is configured to receive transaction data derived from a customer's use of a debit or credit card at a debit or credit card reader 150. Transaction data may comprise one or more of: a customer's credit or debit card information, a location the credit or debit card was used (e.g., site identifier, dispenser identifier, merchant identifier, and/or geospatial coordinate), or a time the debit or credit card was used. In an implementation of the system 100, the transaction data receiver 160 may be part of a credit card processing system. In other implementations, the transaction data receiver is a computer system separate from the credit or debit card processing system. The debit or credit card reader 150 generally refers to a device configured to obtain information from a card including information about the person to whom the card was issued and/or information about the entity issuing the card. Debit or credit cards are two examples cards that may be read by the debit or credit card reader 150. Loyalty cards may be read by the debit or credit card reader 150. The debit or credit card reader 150 may read automated clearing house information, a token, or other payment identification information about one or both of the person to whom the card was issued and the issuing entity. Accordingly, the systems and methods described may be applied to derive information to provide targeted content from information obtained from various types of cards (e.g., loyalty cards, credit cards, debit cards, payment tokens, automated clearing house information, visual codes (e.g., QR codes, bar codes)).

FIG. 1A also shows a customer profile transmitter 180. The customer profile transmitter 180 can be configured to transmit customer profile information derived at least in part from customer debit or credit card information which forms part of the transaction data. A customer profile is generally information about a particular customer. For example, customer profile information may comprise a general categorization of the customer's interests (e.g., sports enthusiast, food lover, pet owner). The customer profile information may comprise general information about the customer's finances (e.g., which bank issued their card, credit limit, level of activity with the card). The customer profile information may comprise general information regarding purchases (e.g., last visit to the current location, scheduled visits to the current location such as an oil change, preferred shopping days or times). In some implementations of the system, the customer profile may not be information about the customer as noted above, but may directly contain or refer to actual pre-selected content (e.g., a playlist) for the customer. The customer profile may also contain the content itself for the customer.

In general, the customer profile information is any data that a player utilizes to define any portion, order, or other aspect of content to display for the specific customer at the point-of-sale.

Figure 2:
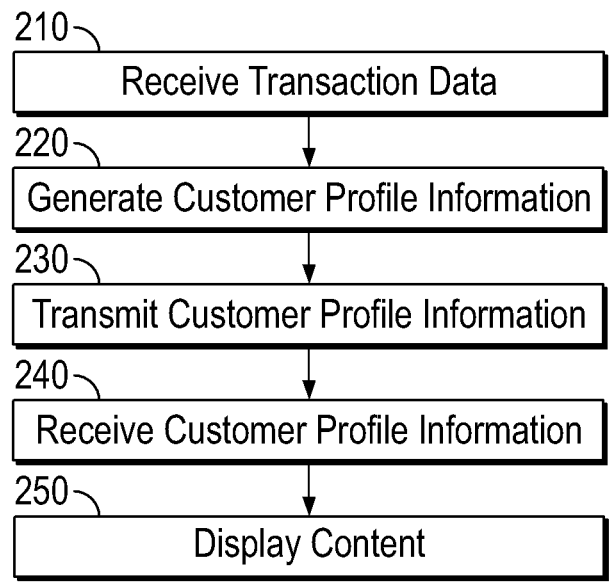
FIG. 2 is a flow diagram of an implementation of the method for targeted point-of-sale content delivery according to the invention.

FIG. 2 is a flow diagram of an implementation of the method for targeted point-of-sale content delivery according to one embodiment of the invention. At a block 210, transaction data is received. The transaction data can be received directly from a debit or credit card reader, or the transaction data can be received indirectly from a debit or credit card reader, through one or more intermediaries (e.g., transaction authorization server, anonymizer server, cryptographic server, pre-processing server). According to an example implementation, the transaction data is received via a network (e.g., satellite, LAN, WAN, cellular, peer-to-peer). The network may be a public network (e.g., the Internet), or a private network (e.g., VPN). This network may be the same network used for sending customer profile information. The information can be transmitted using appropriate and known network transmission protocols (e.g., TCP/IP).

In advantageous implementations of the system, the transaction data is received in real-time. Real-time is defined herein as the duration of a typical purchase period. For example, the transaction data can be received within seconds after the credit or debit card reader reads the card. While the transaction data may be received as individual transmissions of transaction data as the transaction occurs, the transaction data may be received in batch mode where each batch may contain data for one or more transactions.

The transaction data received is derived in part from the customer's use of a debit or credit card at a debit or credit card reader. In some cases, the customer's complete credit card information is not accessible. Even in this case however, information is derivable from the customer's debit or credit card. For example, the format of customer payment card number can comply with the ISO/IEC 7812 "Identification cards—Identification of issuers" specification wherein specific digits represent information about the identification card or the issuer. Typically, the first six digits of a credit card number are not secure, and are available for use by a transaction data receiver that is not part of a credit card authorization and processing system.

Another aspect of the transaction data may be that the transaction data is derived from the use of a specific debit or credit card reader. For example, the customer uses a card reader 150 at a particular gas pump, at a particular gas station. Accordingly, location information (e.g., one or more of pump, station, city, state, country) can be derived from the customer's use of a debit or credit card at the debit or credit card reader.

Another aspect of transaction data may be the time a customer uses the debit or credit card reader, as a timestamp is generally associated with a particular transaction in the card processing procedure. In one implementation, the timestamp may be the moment the card was swiped. In another implementation, the timestamp may be the moment the card authorization request was transmitted. In another implementation the timestamp may be the moment the card was authorized. In an implementation where the card is read using one or more contactless payment technologies such as radio frequencies (e.g., RFID) or near field communication (NFC). In such implementations, the timestamp may be the moment the contactless payment communication was detected. It will be appreciated that one or more of the timestamps described herein may be used individually or in combination with other information to identify a particular customer, at a particular point of sale.

At a block 220, a customer profile is generated. According to one implementation, a customer profile transmitter generates customer profile information based at least in part on the received transaction data. In an example implementation, the customer profile transmitter first generates the customer profile at least in part by evaluating the first six digits of the debit or credit card. These digits identify of the card issuer (e.g., a specific bank or department store) and card type (e.g., Visa, America Express, Mastercard, Diner's Club). In this case, the "customer profile" may be the card issuer and/or card type.

At a block 230, the customer profile information is transmitted via a network (e.g., satellite, LAN, WAN, cellular, peer-to-peer). This network may be the same network used to receive the transaction data. In another implementation, the customer profile information is transmitted via a different network than the network used to receive the transaction data. The network may be a public network (e.g., the Internet), or a private network (e.g., VPN). The information is generally transmitted using appropriate and known network transmission protocols (e.g., TCP/IP). The information may also be processed prior to transmission for example, to optimize (e.g. compression) or secure (e.g., encryption) the transmission.

In some advantageous implementations, the transmission of the customer profile can be performed in response to a request from the player. In this implementation, the customer profile transmitter can wait for a request from the player to transmit the customer profile information. In another implementation, the transmission of the customer profile to the player may be automatic (e.g., once the profile is generated, once the profile is received, after a configurable amount of time). One customer profile for a transaction can be transmitted or multiple customer profiles for the same transaction can be transmitted. In this implementation, certain attributes for the customer profile may be quickly assembled. These attributes can be transmitted in a first customer profile. Subsequent customer profile information, either generated or received, can be transmitted in subsequent customer profiles.

At a block 240, the customer profile information is received. The customer profile information may be received directly or indirectly. The customer profile information may be received via a network (e.g., satellite, LAN, WAN, cellular, peer-to-peer). In another implementation, the customer profile information can be transmitted via a different network than the network used to receive the transaction data. The network may be a public network (e.g., the Internet), or a private network (e.g., VPN). The information can be generally transmitted using appropriate and known network transmission protocols (e.g., TCP/IP). The information may also be processed upon receipt for example, to optimize (e.g., compression) or secure (e.g., encryption) the transmission.

At a block 250, the received customer profile information may be used, at least in part, to display content. For example, rules can process the customer profile to determine the content to display to the identified customer. Rules can organize a sequence of content selected for display. In the case where multiple customer profiles are transmitted for the same transaction, the content selected and/or sequence of content may be revised as the content is played based on the transmitted customer profile information. Thus, a sequence of selected content, tailored for the customer, can be displayed to the customer.

Figure 3:
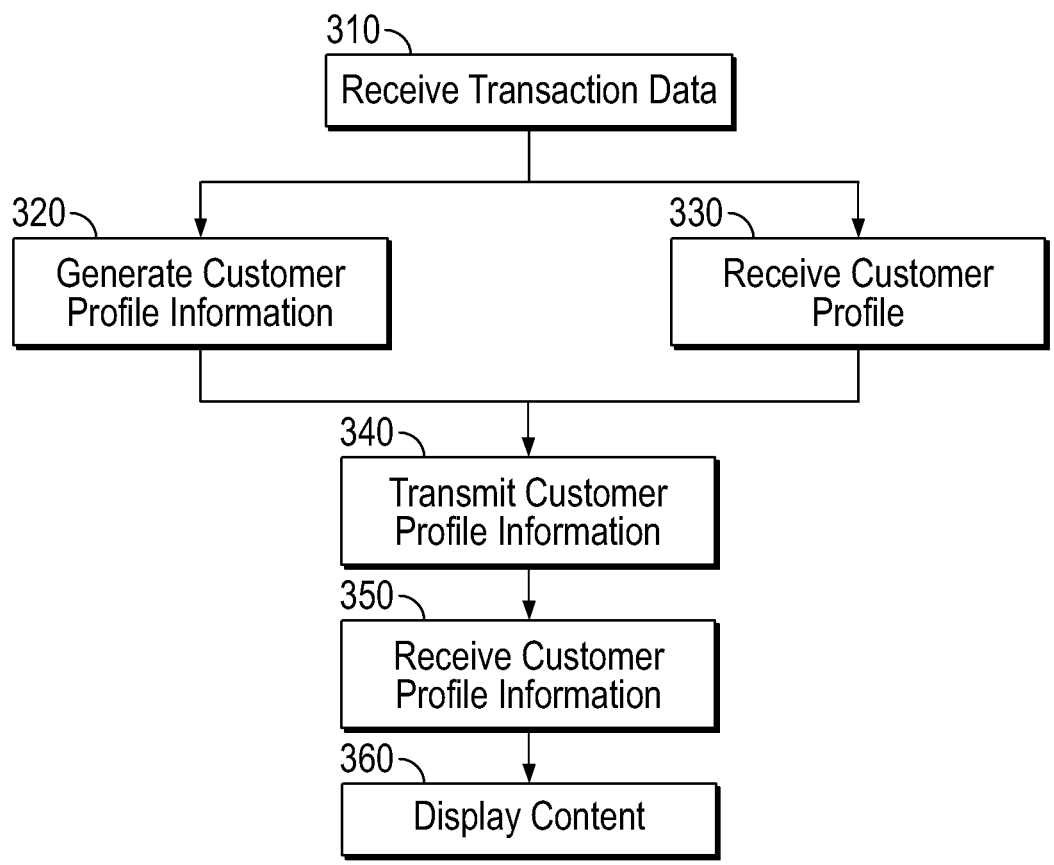
FIG. 3 is a flow diagram of a second implementation of the method for targeted point-of-sale content delivery according to the invention.

FIG. 3 is a flow diagram of a second implementation of the method for targeted point-of-sale content delivery according to the invention. The flow begins at a block 310 when transaction data is received. The transaction data is received, for example, as described above in FIG. 2.

According to this implementation, the transaction data may be used to generate a customer profile at a block 320. For example, generating a customer profile may comprise evaluating digits of the credit or debit card swiped at the credit or debit card reader.

The transaction data may be used at least in part to receive a customer profile at a block 330. In an example implementation, the customer profile transmitter issues a request via a network to, for example, a credit card issuing company. The request comprises information to identify a particular transaction. For example, the transmitter may provide a precise transaction timestamp and location that could be used by a credit card profile lookup server to sufficiently identify the particular cardholder. Using this information, additional information about the cardholder (e.g., affinities, purchases, credit limit, address) can be compiled by the profile lookup server, and transmitted in a customer profile in response to the request. The customer profiler transmitter can receive a customer profile as a response to the request.

According to an implementation, the system may be configured to perform one of blocks 320 and 330. According to an implementation, the transmitter may be configured to perform one or both of blocks 320 and 330. In this implementation, the method may be configured perform the blocks in parallel or in series. These blocks may also be repeated to refine the customer profile, for example, by collecting additional information or obtaining information not previously available.

At a block 340 the customer profile information is transmitted in a method similar to that described in FIG. 2. In an implementation, block 340 can be repeated to accommodate refining of the customer profile by blocks 320 and/or 330. Similar to FIG. 2, at a block 350 the customer profile information is received and at a block 360 content is displayed.

Figure 4A:
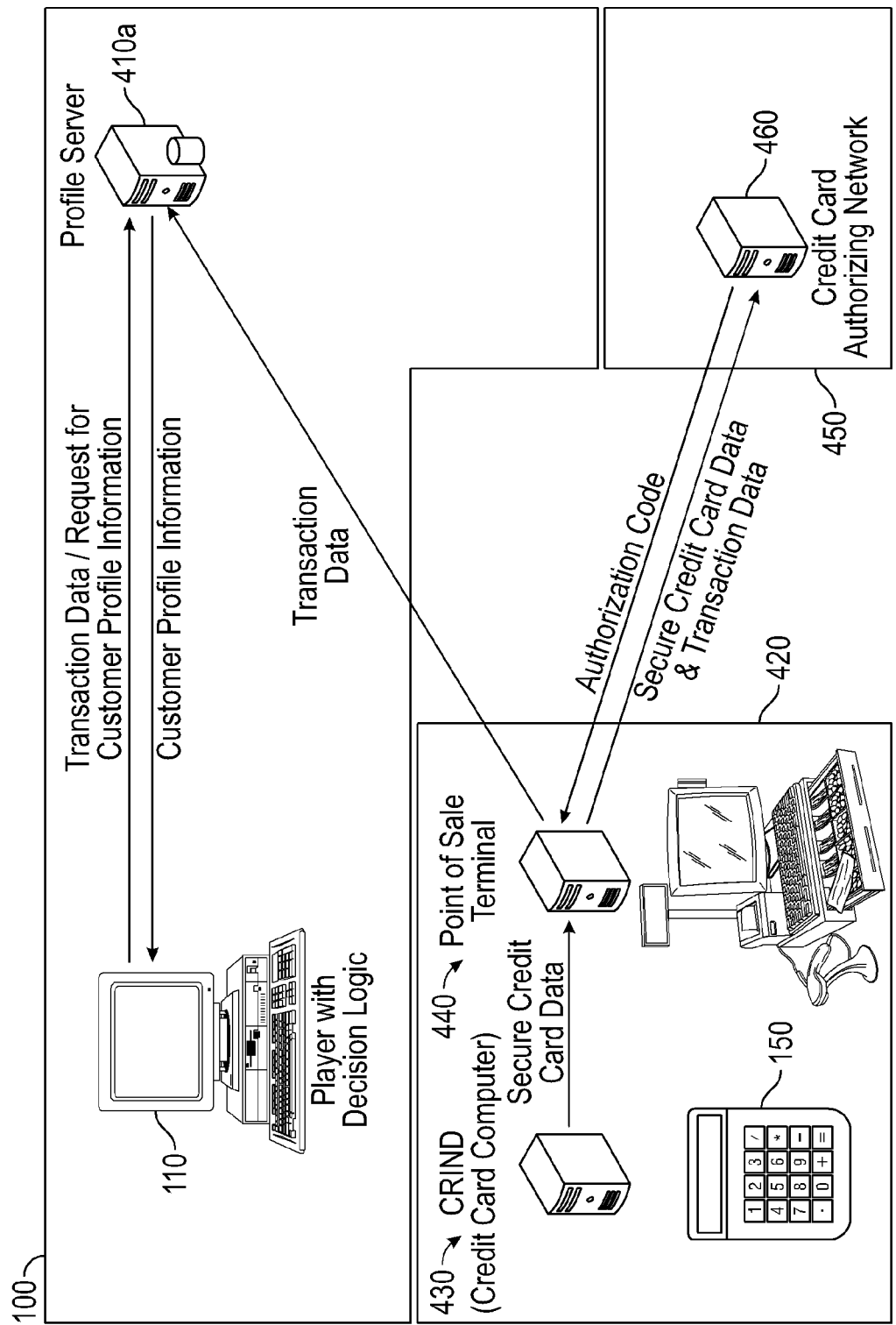
FIGS. 4A-4C are block diagrams of implementations of a targeted point-of-sale content delivery system according to the invention integrated at a point-of-sale location.
Figure 4B:
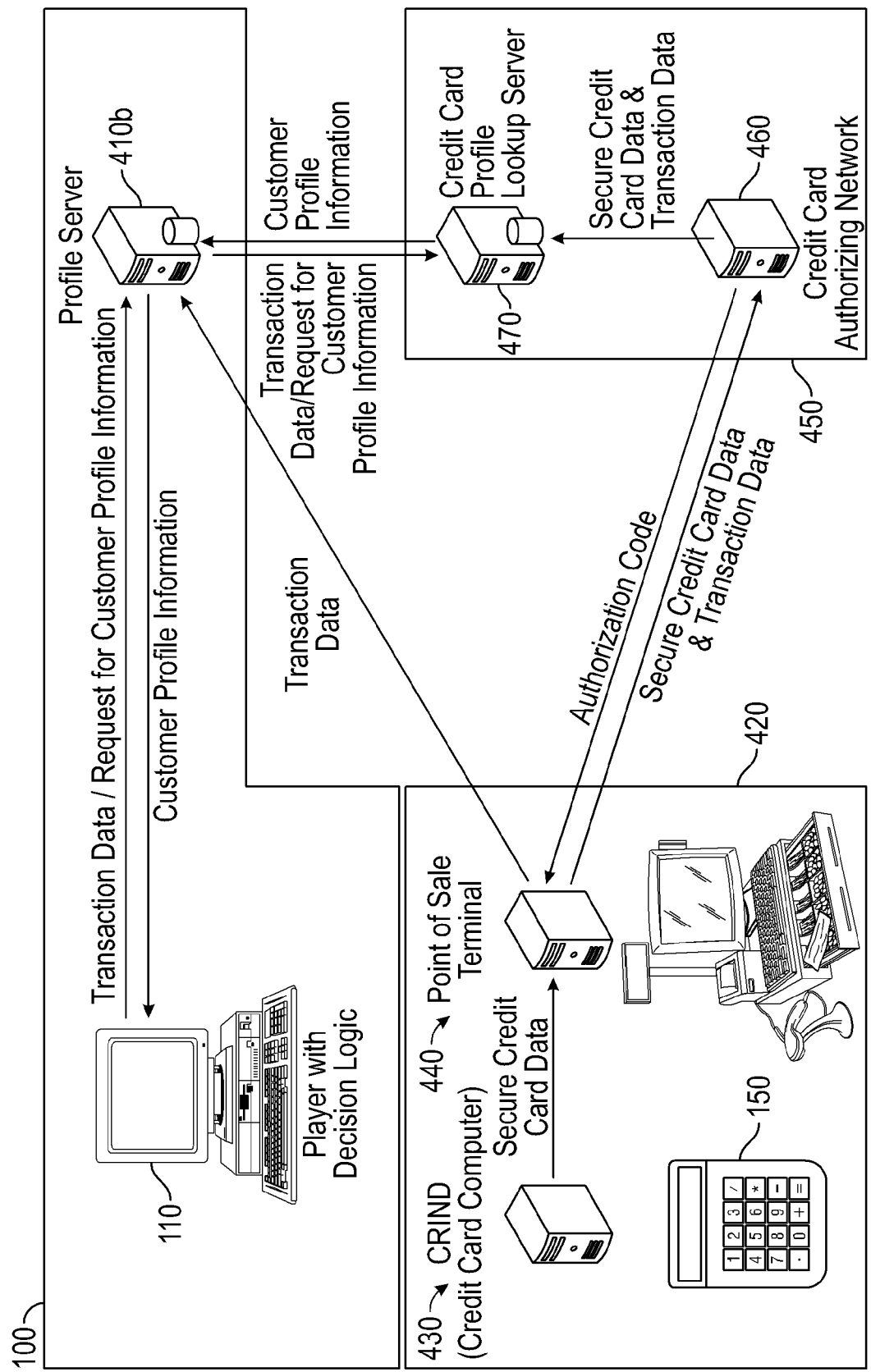
Figure 4C:
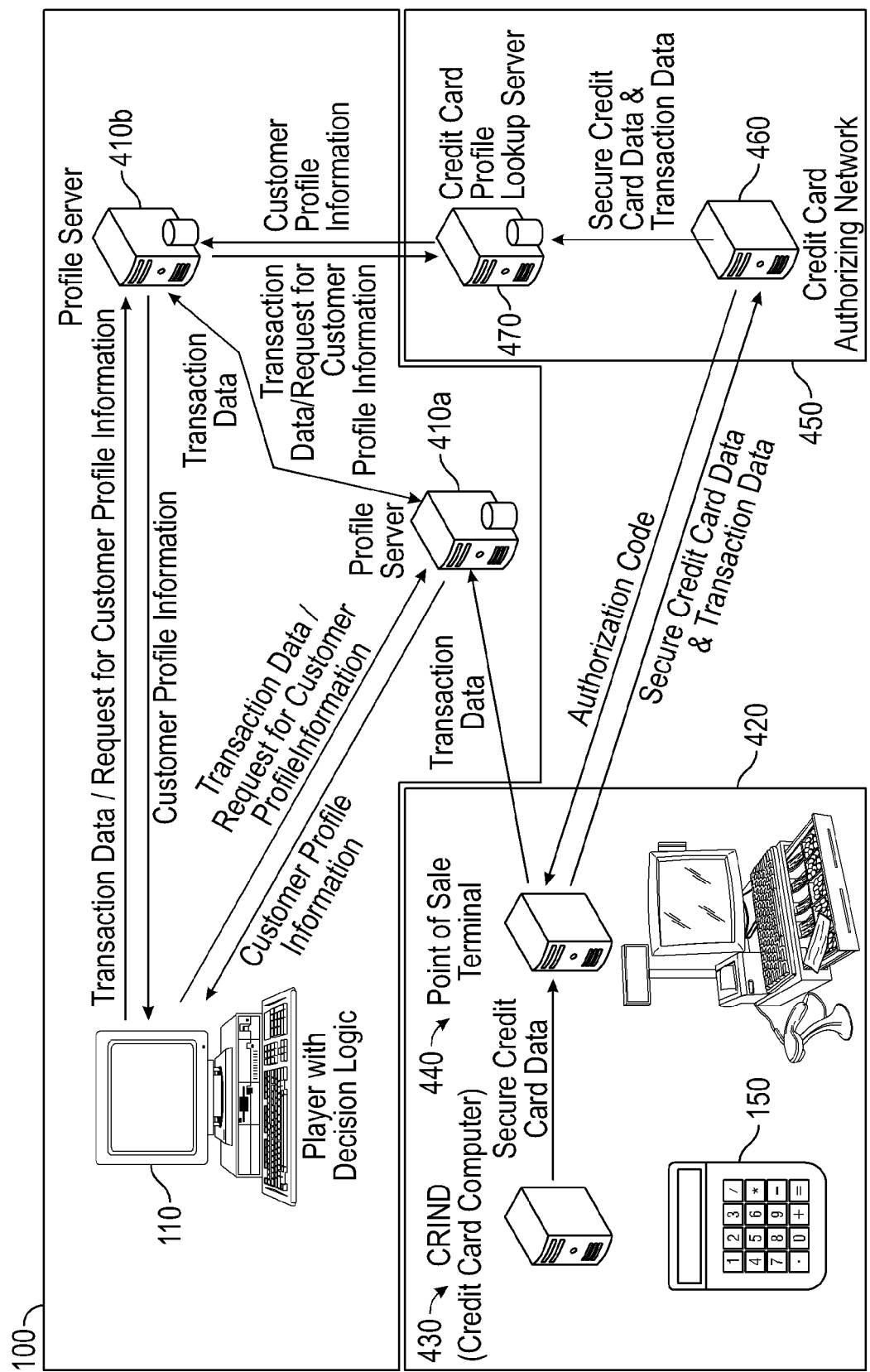

FIGS. 4A-4C are a block diagrams of implementations of a targeted point-of-sale advertisement system according to the invention integrated at a point-of-sale location.

According to this example, three main systems are shown: a targeted point-of-sale advertisement system 100, a merchant system 420, and a credit card payment processing system 450. The connections between the systems and components occur via network (e.g., satellite, LAN, WAN, cellular, peer-to-peer) which have been omitted to simplify the diagram.

The targeted point-of-sale advertisement system 100 is one possible implementation of the system shown in FIG. 1. The example system illustrated in FIG. 4A comprises a profile server 410*a* which may comprise a transaction data receiver and a customer profile transmitter. In this embodiment, the profile server 410*a* also generates the customer profile for transmission.

In some implementations, the transaction data receiver and/or the customer profile transmitter may be implemented separately. In FIGS. 4A-4C, the profile server 410*a* is shown as a network connected, possibly remotely located, device. However, it will be appreciated that the transaction data receiver and/or the customer profile transmitter may be physically located anywhere in the targeted point-of-sale advertisement system 100 or in the merchant system. For example, in an implementation at a gas station, the customer profile server 410*a* may be implemented on a computing device installed at the convenience store and configured to communicate with other components installed at the pump. In another alternative, the customer profile server may be part of the player 110.

In the example shown in FIG. 4A, the merchant system comprises card reader 150. For example, the card reader 150 can be a card reader in dispenser (CRIND) 430 such a Gilbarco Q11489-06 Card Reader. In another implementation, the card reader 150 may read a card using one or more contactless payment technologies such as radio frequencies (e.g., RFID) or near field communication (NFC). The card reader 150 may be integrated with the dispenser or coupled to the dispenser. The card reader 150 facilitates customer use of credit and debit cards for payment.

The credit or debit card information can be transmitted to a point of sale terminal 440. In an implementation at a gas station, this could be a terminal located in a convenience store at the station. The point-of-sale terminal 440 can generally be used for processing purchases. In the case where a customer uses a credit or debit card, the point-of-sale terminal 440, directly or indirectly through other intermediaries, transmits secure credit card data and transaction data derived from a customer's use of a debit or credit card at the debit or credit card reader 150 to a credit card issuer system 450. It will be understood that the point-of-sale terminal 440 in this example can refer to any hardware that is part of a point-of-sale system (e.g., terminal, site controller) to obtain information, for example, from the point-of-sale.

The transaction data transmitted to the credit card issuer system 450 can be used to generate an authorization code for the purchase. For example, an authorization server 460 can receive secure credit card data along with other transaction information to authorize the particular card for the transaction.

The point of sale terminal 440 may also transmit transaction data to the point-of-sale content delivery system 100. The transaction data transmitted to the point-of-sale content delivery system 100 can be processed as described above in reference to FIG. 1. In this embodiment, the entire credit card number, which is generally secure data available only to the credit card authorizing network 450, need not be sent to the profile server 410a. Instead, the transaction data may include just the first six digits of the credit or debit card that was used, which is publicly available information. In this embodiment, the profile server may be configured to act as a well-known loyalty program server, which is often used to track card use for customer loyalty programs. The transaction data sent to the profile server 410a may also include other information as discussed above, such as a time stamp and/or location information. The profile server can then store the transaction data along with a customer profile that is generated from the first six digits of the card. In this case, the customer profile may be card issuer and type. When the user begins pumping gas, the player 110 may send some transaction data to the profile server, such as location and time information, and query the profile server database for matching transaction information. If a match is found, the customer profile (e.g. card issuer and type) is returned to the player 110, and the player can then configure its play of entertainment and advertisement according to stored rules regarding the received customer profile.

FIG. 4B shows an implementation where customer profile information is received by the point-of-sale content delivery system 100 from a third party, in this example a credit card issuer system 450.

The targeted point-of-sale content delivery system 100 is similar to the system shown in FIG. 1. The example system illustrated in FIG. 4B comprises a profile server 410b which may comprise a transaction data receiver and a customer profile transmitter. In this example, the profile server 410b can request customer profiles from a credit card profile lookup server 470.

In this example, secure credit card information and transaction data can be sent to a credit card authorizing network 460 in the credit card issuer system 450. Transaction data can also be sent to a profile server 410b on the targeted point-of-sale advertisement system 100 as described above with respect to profile server 410a in FIG. 4A. The credit card authorizing network 460 can transmit secure credit card data and transaction data to a credit card profile lookup server 470. This information can be used by the credit card profile lookup server 470 to generate or retrieve a customer profile for the cardholder initiating this transaction. The customer profile can contain analytic data about the customer such as general affinities (e.g., affinities such as sports or pets, purchases, credit limit, address). Customer profiles associated with each holder of a card with a particular number are routinely created by the credit card companies.

The profile server 410b of the targeted point-of-sale advertisement system 100 can submit a request to the credit card profile server 470 to retrieve a customer profile. This request can contain transaction data that sufficiently permits the credit card profile lookup server 470 to identify the customer initiating the transaction with their corresponding customer profile. For example, given a particular transaction location and timestamp received by the credit card profile lookup server 470 from the profile server 410b, the credit card profile lookup server 470 could search for currently pending or recently completed authorization requests matching the transaction data. From this match, the identity of the specific cardholder at the card reader 150 can be found. The customer profile information for that cardholder can then be transmitted according to the methods described above to the profile server 410b. From the profile server 410b, the customer profile information for that cardholder can then be transmitted according to the methods described above to the player 110 proximate to the card reader 150 and used to select and present content to the customer.

As an alternative to the request based transmission of a customer profile from the credit card profile lookup server 470 to the profile server 410b, the credit card profile lookup server 470 could recognize transactions arising from specific locations, and serve the customer profile to the profile server 410b whenever it sees a transaction from one of these locations. In this case, the credit card profile lookup server 470 would push customer profiles to the customer profile server 410b without waiting for a request from the customer profile server 410b. The customer profile would generally be accompanied by some transaction data, so that when receiving such customer profiles, the customer profile server could then match the transaction data associated with the customer profile with transaction data it has identifying a particular player to then transmit the customer profile to.

FIG. 4C shows a combination of the systems described in FIGS. 4A and 4B. FIG. 4C shows implementation where the customer profile information can be generated and/or customer profile information can be received from a third party, in this example a credit card issuer system 450. While shown as two distinct profile servers 410a and 410b, it will be appreciated by one having skill in the art that the profile servers may be the same server. As discussed in reference to FIG. 3, customer profiles may be requested or generated in parallel or in series. The customer profiles may be obtained once or repeatedly allowing the system to refine the customer profile over time.

Figure 5:
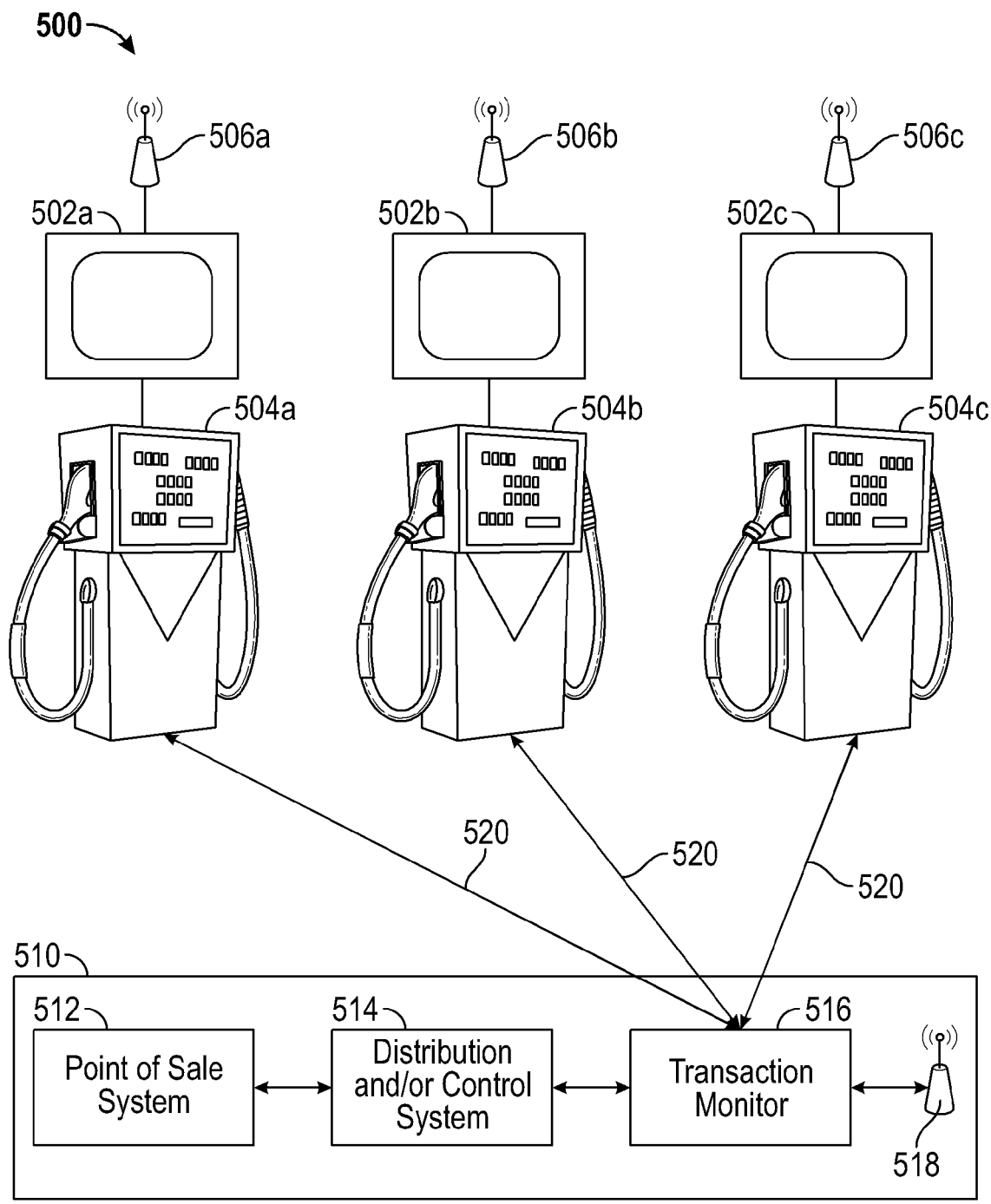
FIG. 5 shows a functional diagram of a targeted point-of-sale content delivery system.

FIG. 5 shows a functional diagram of a targeted advertisement point-of-sale system. The system 500 shown includes three players 502a, 502b, and 502c (hereinafter collectively and individually referred to as player 502). A system may include fewer than three players or more than three players. Each player 502 is associated with a dispenser 504a, 504b, 504c (hereinafter collectively and individually referred to as dispenser 504). As shown, each player is located proximate to a dispenser. In some implementations, the player 502 may be coupled with the dispenser 504 to allow signal exchanges (e.g., data, power) between the elements. The dispensers illustrated in FIG. 5 are gasoline dispensers. However, as discussed above, the system described in FIG. 5 may be applied to other point-of-sale settings such as grocery stores, fitness centers, and electrical vehicle charging stations. Accordingly, the dispensers 504 may be a point-of-sale system which facilitates transactions at such points-of-sale.

Each player 502 is also coupled with a communication device 506a, 506b, and 506c (hereinafter collectively and individually referred to as communication device 506). Examples of the communication device 506 include one or more of an 802.11 wireless network component, a Bluetooth component, cellular communication component, satellite transceiver, Ethernet equipment (e.g., cable, network card, router, hub), or other wired or wireless communication element. As shown, the communication device 506 is coupled externally to the player 502. However, in some implementations, the communication device 506 may be included in the player 502 (e.g., within the housing of the player). Similarly, the player 502 is shown physically separated from the dispenser 504. However, in some implementations, the player 502 may be included in the dispenser 504.

The dispensers 504 may be associated with a convenience store (C-store) 510. The convenience store 510 may be a central location near the dispensers 504 which includes various elements to allow transactions to be completed at the location. For example, in a gasoline station, the convenience store 510 may be a mini-market which also sells snacks and other conveniences. The mini-market may include a point-of-sale system 512 for authorizing and consummating purchases at the dispenser and for goods sold in the store. The point-of-sale system 512 may be coupled with a card reader, optical scanner, printer, and other input and output devices (not shown). Card readers will also often be provided at each dispenser 504 which communicate with the point-of-sale system 512 for authorizing and consummating gasoline purchases made at the dispensers 504. Accordingly, a card reader is located proximate (e.g., at dispenser, at convenience store near a dispenser) to the display.

The convenience store 510 may also include a distribution and/or control system 514. The distribution and/or control system 514 may be configured to exchange signals which relate to the operation of the dispensers 504. For example, if a customer pays for their transaction in the convenience store 510, a dispenser 504 authorization may be transmitted from the distribution and/or control system 514. The distribution and/or control system 514 may couple the point-of-sale system 512 to the dispensers over communication lines 520. In advantageous embodiments described in further detail below, the distribution and/or control system communicates with the dispensers through a transaction monitor device 516. The transaction monitor device 516 may be configured to be essentially invisible to the dispensers 504 and the point-of-sale system 512, just passing the usual credit card data, authorizations, and the like between the dispensers 504 and the point-of-sale system 512 without modification or interference. However, during this pass through of transaction data, some of the information may be processed for use by the viewers 502 as described further below. The transaction monitor 516 may be included in the point of sale system 512, in the dispenser 504, and/or implemented as a separate device in data communication with one or both of the dispenser 504 and the point of sale system 512.

The transaction monitor device may include or be coupled to a communication device 518. The communication device 518 may be configured to transmit and receive data from the communication devices 506 associated with the players 502. Examples of the communication device 518 include an 802.11 wireless network router, a satellite communication component, a cellular communication device, Bluetooth, Ethernet equipment (e.g., cable, network card, router, hub), or other wired or wireless communication elements. In one application, the transaction monitor device 516 and players 502 are members of a local network of any format. It may be desirable to include wireless communication elements to, for example, retro-fit existing gas station environments with the player system described herein.

Each dispenser 504 may be coupled with the custom device and wiring component 516. The transaction monitor device 516 may be configured to receive information regarding transactions occurring at a dispenser. As discussed above, the transaction information may include credit card information, ZIP code, dispenser information, information received during the transaction (e.g., election for a car wash, price of gasoline selected, amount of gasoline dispensed). The transaction monitor device 516 may be further configured to transmit information through the wireless device 518 to the players. Such information may include the transaction information or customer information derived from the transaction information as will be described below.

With the configuration shown in FIG. 5, as information is passed from the dispenser 504 to the point-of-sale system 512, the custom device and wiring component 516 may capture all or a portion of the data as it is transmitted between the dispenser and the point-of-sale system 512.

Figure 6:
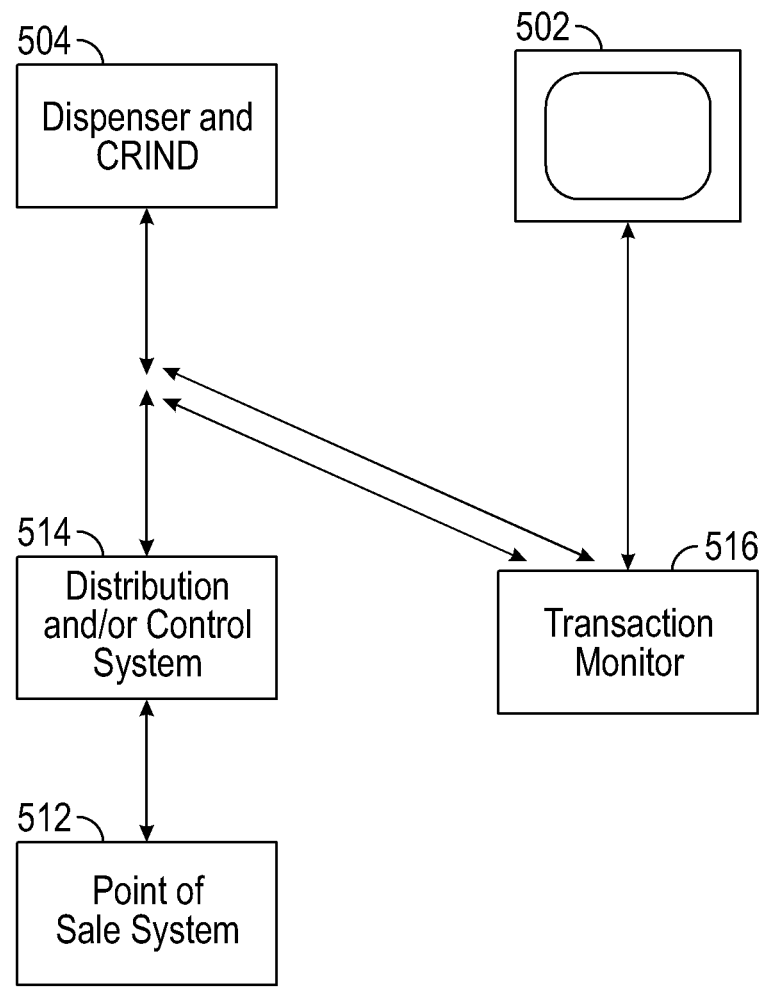
FIG. 6 illustrates a data flow diagram for a targeted point-of-sale content delivery system like that shown in FIG. 5.

FIG. 6 illustrates a data flow diagram for a targeted advertisement point-of-sale system like that shown in FIG. 5. The simplified view shows how data may flow between the dispenser 504 including a card reader in a dispenser, the distribution and/or control system 514, the transaction monitor device 516, and the player 502.

When a customer swipes a credit card at the dispenser 504, credit card information is transmitted from the dispenser 504. As shown in FIG. 6, this information may include track 1 and track 2 credit card data. The magnetic stripe on the back of the card has three recording tracks, two of which are generally used on a credit or debit card. Track 1 data may include the name of the cardholder, a card number, an expiration date, and other information such as card issuer specific information. Track 2 data does not include the cardholder name, but includes some of the same information as is encoded on Track 1. Notwithstanding the format of the data, the elements of information included in the credit card information received from the dispenser 504 can be processed as described herein.

Figure 10:
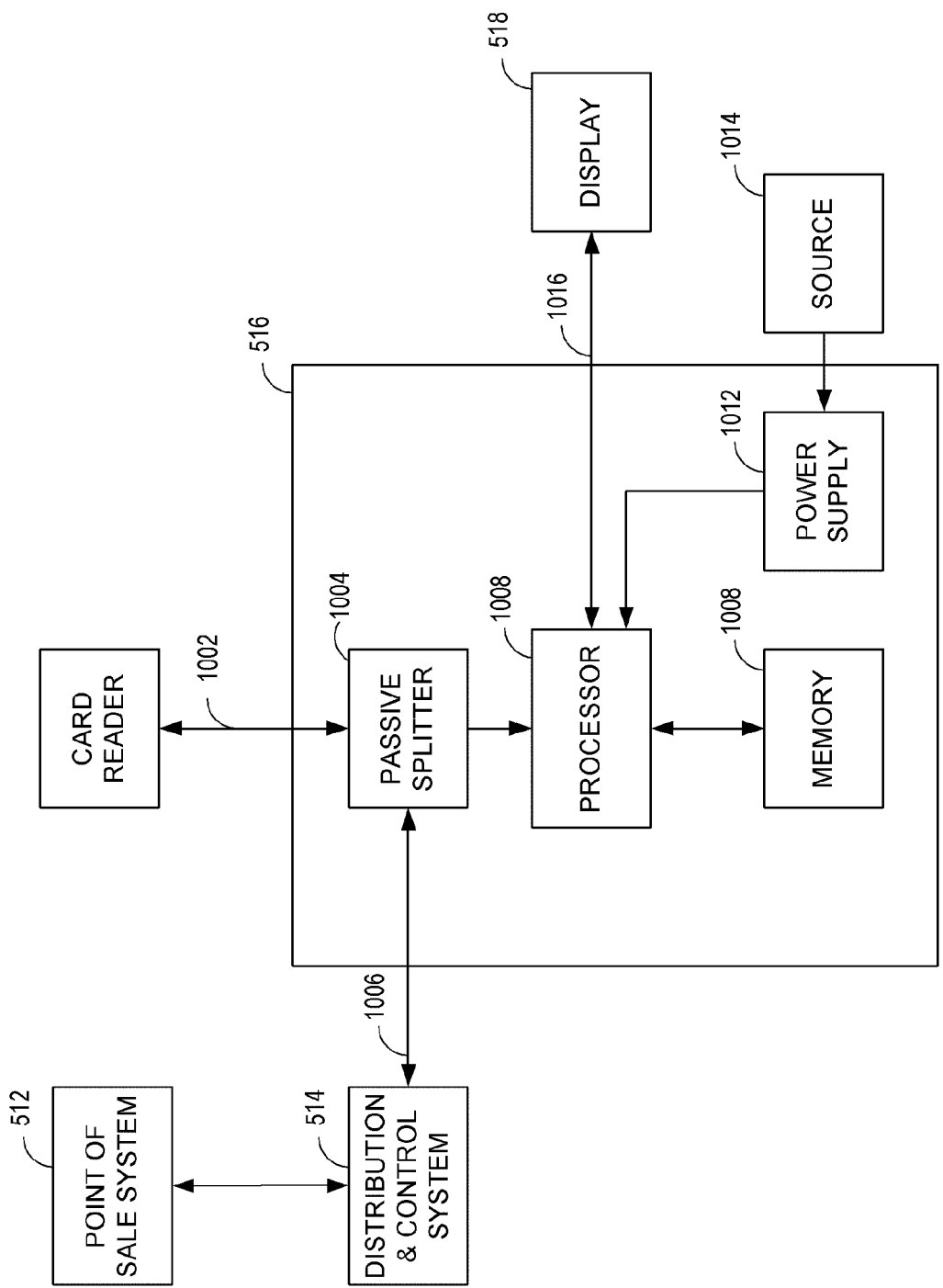
FIG. 10 shows a functional block diagram for a transaction monitor.

As shown in FIG. 6, the transmission path for the credit card data may be branched. To achieve standard authorization and card processing functions, the information may be transmitted to the point-of-sale system via an existing distribution and/or control system 514. The data path may also transmit the information to or through the transaction monitor device 516. To ensure proper functioning of the normal credit authorization process, it can be useful for the transaction monitor 516 to be configured such that the data flows to the point-of-sale system regardless of the powered on state or functionality of the transaction monitor 516. In these cases, the transaction monitor 516 may not receive and re-transmit the data, but may merely monitor the signals as they pass through the transaction monitor 516. An implementation of the transaction monitor is shown in FIG. 10.

The transaction monitor 516 may be configured to use the transaction information to determine characteristics of the customer at the dispenser 504. For example, the credit card issuer and type may be identified based on a portion of the card number for the card swiped at the dispenser 504. As another example, the name of the cardholder may also be obtained from the received credit card information. As a further example, the customer may enter information such as a ZIP code while at the dispenser 504 which is also transferred to the point of sale system 512 during the transaction. One or more of these characteristics, or data derived from these characteristics, may be transmitted from the transaction monitor 516 to the player 502. The transmission may include wirelessly transmitting the characteristics using a wireless communication device coupled with the custom device and wiring component 516 (e.g., wireless communication device 518). The player 502 may receive such wireless signals using a wireless communication device coupled therewith (e.g., wireless communication device 506). The player 502 may use these characteristics to select content to display at the dispenser 504 where the card was swiped as described above.

Additional information may be transmitted from the dispenser such as fuel flow information. Fuel flow information may include the amount of gas pumped, price per gallon, and the flow rate. The fuel flow information may be passed to or through the transaction monitor 516 in a similar fashion as the credit card information. As with the credit card information, the fuel flow information may also be provided by the transaction monitor 516 to the player to be considered for selecting appropriate content.

Figure 7:
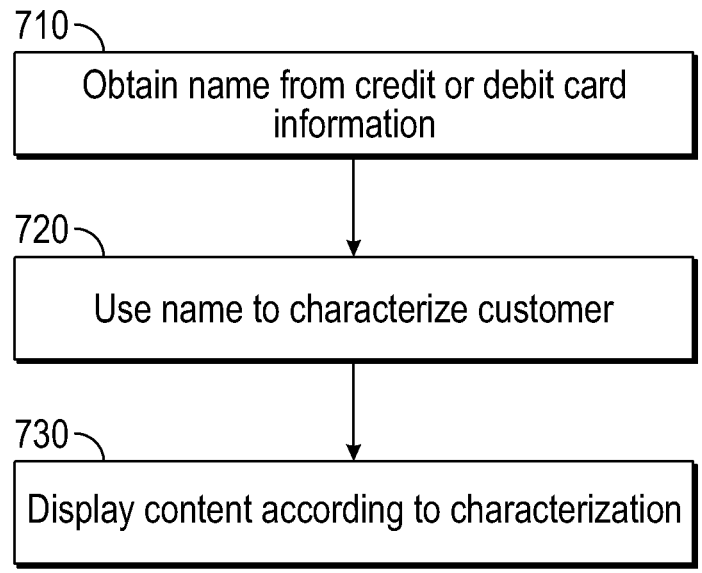
FIG. 7 shows a flow diagram for delivering targeted content to a customer.

The inventors have realized that the cardholder name provided during the transaction can be used in a variety of ways to deliver targeted content to the customer. As illustrated in FIG. 7, at block 710 a cardholder name is obtained from data in a credit or debit card transaction. At block 720, the name is used to characterize the customer. In one advantageous example described in more detail below with reference to FIG. 9A, the first name of the cardholder can be compared to a name database that associates given names with the likely gender of the person with that name. For example, if the first name is Brian or Timothy, it is known with better than 99% likelihood that the customer is male based on available demographic data sources for the United States. As another example, an advertiser using the system may provide a customer database that is stored on or otherwise available to the transaction monitor (e.g., in data communication with the transaction monitor). This database may be searched for the full name of the cardholder to determine if the customer at the gas pump is a current customer of the advertiser. Using a similar process, further characterizations of the customer based at least in part on their name may include ethnic background and age range. For example, if the first name is Pierre, it is known that the customer may have French origins. As another example, certain names may be more prevalent with certain age groups (e.g., Majorie was popular in the 1920s). At block 730, content may be displayed that is tailored to the characterization of the customer based at least in part on the name or a portion thereof.

Other information may be received by the point-of-sale system as part of the transaction that can be used in conjunction with the name information. For example ZIP code information may be input as part of a debit or credit card transaction (as part of an authentication process for example), as described further below with reference to FIG. 9B. In one implementation, using the received ZIP code and name information, the customer may be identified via publically available or privately maintained database(s) to determine information about the customer that is useful for targeting advertisements and other display content.

Figure 8:
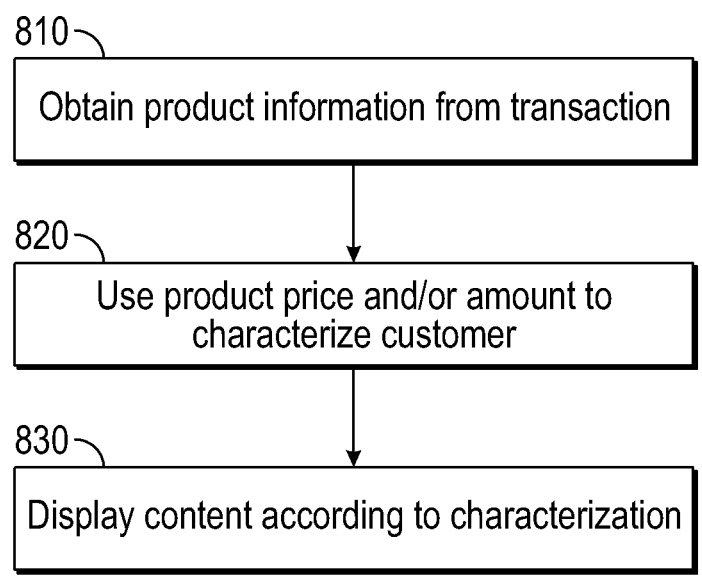
FIG. 8 shows another flow diagram for delivering targeted content to a customer.

Another source of useful information for content targeting described further below with reference to FIGS. 8 and 9C which is especially applicable in the gas station environment is information about the price of the purchased product and the amount being purchased. During a fuel purchase transaction, the price per gallon and the amount pumped are sent to the point-of sale system. This information can be used to determine, for example, what grade of gasoline is being purchased and also can provide some information about what kind of vehicle is being re-fueled. FIG. 8 is a flow chart of a possible process of obtaining and using this information. At block 810, information about the product being purchased is obtained from the transaction. In the gas station implementation, this may include price per gallon, and the amount pumped at a given time. At block 820, this information is used to characterize the customer. For example, a customer buying a large amount of premium gas may be considered likely to be more affluent. At block 830, displayed content, including advertisements, can be tailored to the deduced likely nature of the customer.

Figure 9A:
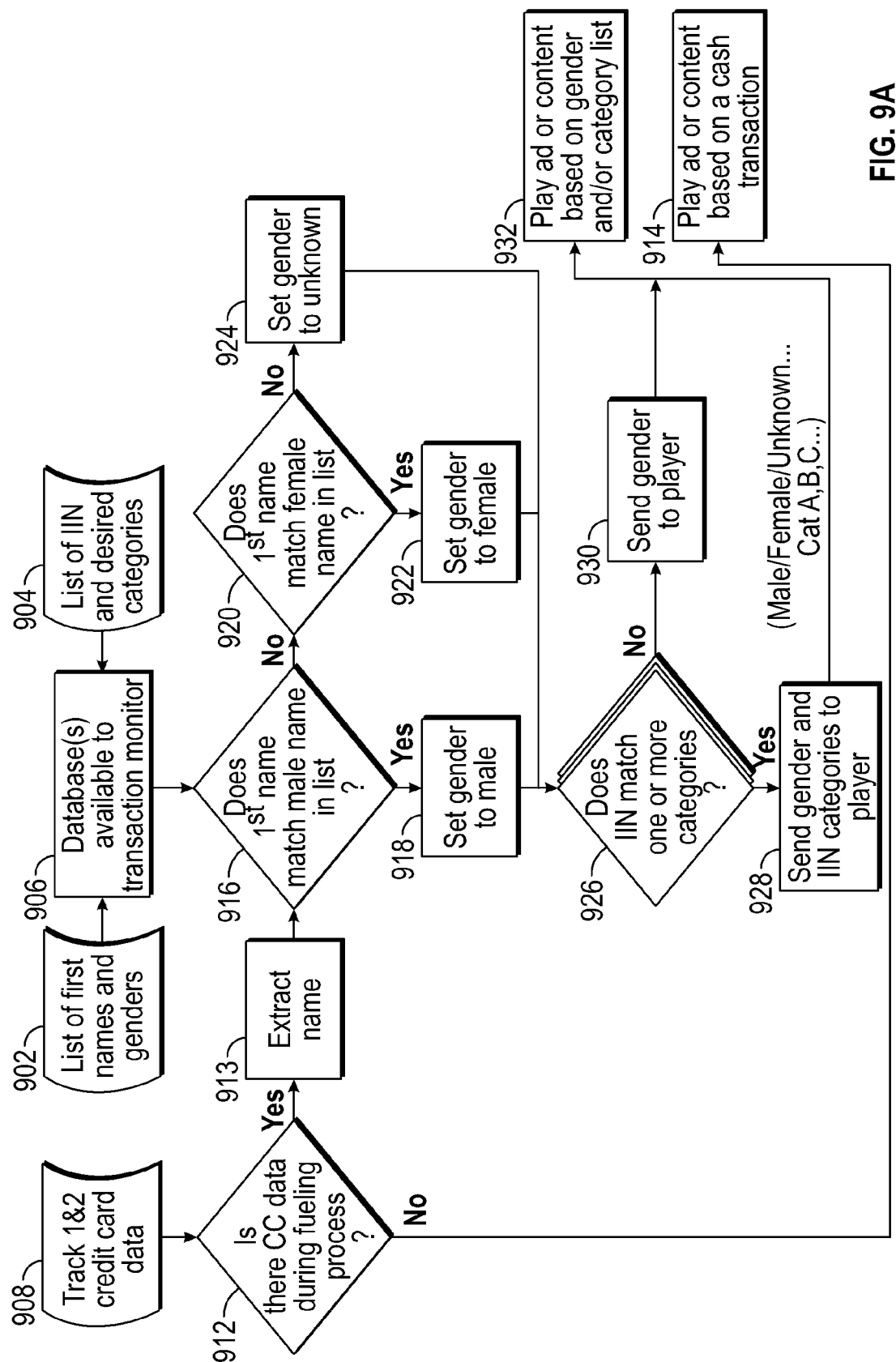
FIG. 9A shows a flow diagram for the operation of the system in one specific implementation of using name information to characterize a customer.
Figure 9C:
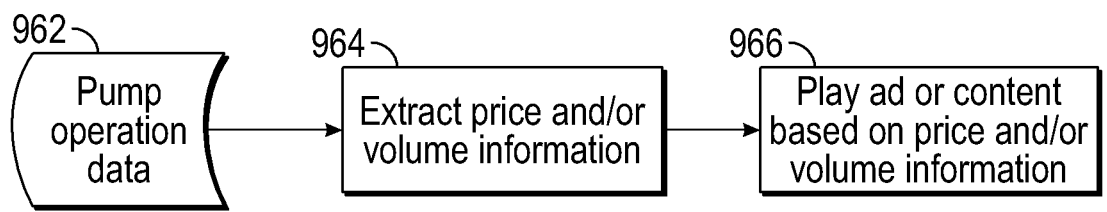
FIG. 9C shows a flow diagram for the operation of the system in one specific implementation of using pump operation information to characterize a customer.

FIG. 9A shows a flow diagram for the operation of the system in one specific implementation. At block 902, a list of names and associated gender information is obtained. Similarly, at block 904 a list of credit card types (e.g., as defined by issuer identification number, also known as the IIN) and associated categorization is obtained. The IIN is the first six digits of the credit card number, and it is assigned based on the nature of the credit card issuer. These can be categorized into travel, merchandising, financial institutions, etc. which can also characterize the customer using the card.

At block 906, the categorization information and gender associations are stored in or otherwise made available to the transaction monitor.

Various elements of transaction information may be provided to the transaction monitor for a given purchase. As shown in FIG. 9A, at block 908, credit card data is provided. At decision block 912, a determination is made as to whether credit card data is available for this transaction. If no credit card data is available, the transaction monitor may be configured to transmit a signal to the player indicating that content should be displayed based at least in part on a cash transaction. At block 914, content is selected and displayed based on this signal.

If credit card data is available, at block 913, the customer name is extracted from the transaction data. At decision block 916, the card holder first name is compared to the list of names and genders, and a determination is made as to whether the first name is a traditionally male name. If the name is identified as a traditionally male name, the gender for this transaction is set to male at block 918. If the name is not identified as a traditionally male name, at decision block 920, a determination is made as to whether the first name is a traditionally female name. If the name is identified as a traditionally female name, the gender for this transaction is set to female at block 922. If the name is not identified as a traditionally female name, the gender for this transaction is set to unknown at block 924. In some implementations, the identification may include a configurable likelihood threshold as it may be desirable to perform gender identification with different degrees of certainty in different applications. Accordingly, the identification may be configured to identify a gender if it is 99.90% likely the first name is of one gender or the other. A table of data, such as that shown in table 1 may be stored in memory of the system and consulted for the identification.

TABLE 1

| First Name | Male Probability Factor | Female Probability Factor | Male likelihood |
| --- | --- | --- | --- |
| Winford | 0.004 | 0.000 | 100.00% |
| Timothy | 0.640 | 0.001 | 99.84% |
| Pat | 2.654 | 2.643 | 50.11% |
| Robert | 3.143 | 0.008 | 99.75% |

In the above deployment, if "Winford" is detected, the gender may be identified as male as "Winford" is associated with a 100% likelihood of being male. Contrast that with the detection of "Pat." As "Pat" is associated with a 50.11% likelihood of being male, the system may not identify a gender for this transaction. It may be useful to lower the threshold for less discerning deployments.

Table 1 also includes a probability factor for male and female. The identification may be based at least in part on the probability factor. As with likelihood percentages described above, the system may be configured to identify gender based on a probability threshold. In some implementations, the same threshold may be used for identifying males or females. In some implementations, the threshold may be different when detecting males or females. For example, if the system is deployed in a men's only gym, it will be more likely that the name is a man's name than a female's name. Accordingly, in such deployments, the probability threshold may be lowered for men and raised for women.

In some implementations, the identification may be based on a combination of one or more data elements, such as those in Table 1. For example, the identification may calculate a probability based on the percentage likelihood and the male factor.

The credit card data may optionally be further analyzed at decision block 926 to determine whether the issuer identification number is categorized in the received list of credit card types. For example, if the card issuer is an airline, a category such as "travel oriented" may be assigned to the transaction. In the case where the credit card data is associated with one or more categories, any categories associated with the credit card data may be associated with the transaction.

Accordingly, the transaction may be associated with a gender and one or more categories. At block 928, the gender and category information may be transmitted to the player. The gender and/or category information may be all or part of a customer profile. As discussed above, a customer profile is generally information about a particular customer. Accordingly, in some implementations, the customer profile may be the gender information. In some implementations, the customer profile may be the category information. Returning to decision block 926, if the credit card data does not match any categories, at block 930, the gender information is sent to the player. At block 932, the player may be configured to select and display content based on the received information. As discussed above, jobs which comprise multiple content elements may be trafficked across the network instructing players 110 to insert specific content into the presentation based on the customer profile. For example, a male oriented content element may be selected when gender is indicated as male. In some implementations, information included in the customer profile (e.g., first name) may also be inserted into selected content for presentation.

FIG. 9B illustrates another implementation of using name information to characterize a customer for targeted display content. The process begins in a manner similar to FIG. 9A, where at decision block 912, a determination is made as to whether credit card data is available for this transaction. If no credit card data is available, the transaction monitor may be configured to transmit a signal to the player indicating that content should be displayed based at least in part on a cash transaction. At block 914, content is selected and displayed based on this signal.

If credit card data is available, at block 942, the customer name and ZIP code entered on the keypad at block 911 is extracted from the transaction data. At block 954, one or more database(s) that are stored in or otherwise available to the transaction monitor are queried to determine if the name and ZIP code match an identity of a person in the database(s) and associate that identity with characteristics that can be used to target display content to that individual. These databases, which may be publicly available or may be privately maintained, include more specific individual customer information rather than simply gender associations and optionally IIN categorizations as described above with reference to FIG. 9A. The databases 906 of FIG. 9B may include demographic information 946 such as age and/or marital status. In some implementations, third party customer and/or loyalty information 950 may be stored in databases 906. For example, a cell phone network operator could maintain a database including all or a portion of their users. Using the received name and ZIP code information, the database may be consulted to determine if the consumer at the pump is a customer of the cell phone network operator or not. In some implementations, ZIP code information may not be available due to, for example, privacy considerations. In such implementations, a portion of the card data (e.g., first four digits and/or last six digits) and the name may be used to obtain information related to the holder of the card. In some implementations, the entire card number may be used alone or in conjunction with other information. The information may include purchase history or categorization of the card holder (e.g., interests, tastes). The information may not positively identify the card holder in some instances, but rather provide an aggregate generalization of the card holder.

In many cases, such a third party database may be networked and the system may be configured to lookup the information in real-time (e.g., on demand). Other types of information may also be available from such third-party databases. This information may include prior consumer behavior of the individual 948, such as what kind of car they last purchased. As another example, a company may maintain a database that tracks names of consumers who have visited a vendor's website (e.g., new car company) within a specified number of days. The information in the database may also track which car they were interested in by analyzing the pages visited on the website. By retrieving information from this database, the system could then target the consumer with additional or competing advertising based on the tracked information from the vendor. Prior purchase history at the particular gas station could also be stored in database(s) 906 and used to characterize the customer for targeted content. Although the ZIP code can be useful to accurately access these databases, it is not required in all cases, and only name information can be used in some implementations.

If the individual is not found in the database(s) 906, the system can play non-targeted content at block 914. If the individual is found in the database(s) 906, the characterization information associated with the individual in the database(s) 906 can be used to play advertisements or other content based on the identity match at block 956.

In some implementations, it may be desirable to transmit pump operation data to the player to be used in content selection. As shown in FIG. 9C, pump operation data is received by the transaction monitor at block 962 as it is sent to the point of sale system. At block 964, the gasoline price and/or volume information is extracted. At block 966, content is selected and displayed based on the this gas data. In some implementations, categorization may be performed based on the gas data as described above. For example, a category may be assigned to the transaction based on the received gas data. An example of the categorization based on gas data may be to categorize the transaction as "luxury" category when the gas data indicates a selection for premium fuel.

The methods of customer characterization or categorization described above with reference to FIGS. 9A, 9B, and 9C can be used individually or in any combination. Each has its own advantages. The customer characterization of FIG. 9B for example, can produce a very accurate characterization for highly targeted content. The customer characterization of FIG. 9A is more generic, but a very simple database that is easily locally stored can be utilized. When using combinations of these methods, a prioritized sequence of characterizations can be performed. For example, a system may first attempt an individual characterization as described with reference to FIG. 9B, and if an identity match is found, produce targeted content based on this specific information. If no match is found, the system may then attempt to make a gender association, and then base targeted content on this more general characterization.

In some implementations, the transaction monitor 516 may configured between the CRIND 430 and the point of sale terminal 440 and incorporated inot the systems of FIGS. 4A-4C. One non-limiting advantage of such a configuration is that the transaction monitor 516 may be used to collect transaction data for use in providing targeted content without requiring a change to the existing CRIND 430 or point of sale terminal 440. The transaction monitor 516 may thus collect and transmit the above discussed information to the profile server, display, or other element of the system without disrupting existing transaction paths. Due in part to the non-intrusive nature of the transaction monitor 516, the systems and methods described herein may be quickly deployed at a lower cost than more intrusive solutions which might otherwise require altering the operation of the CRIND 430 and/or the point of sale terminal 440.

FIG. 10 shows a functional block diagram for one example embodiment of a transaction monitor. The transaction monitor 516 includes a card reader input/output 1002. The card reader input/output 1002 may be a single input configured to receive transaction information from a plurality of dispensers. In some implementations, the transaction monitor 516 may include multiple dispenser inputs. The card reader input/output 1002 may be coupled with a passive splitter 1004. The passive splitter 1004 may include a first output coupled with a distribution and/or control system input/output 1006. Because the splitter is a passive device, regardless of the operational status of the transaction monitor 516, a signal received by the card reader input/output 1002 is still output to, for example, a distribution and/or control system input/output 1006 connected to a distribution and control system 514 and then to the point of sale system 512 or any other system configured to consummate a transaction. This permits the dispenser system to operate independent of the transaction monitor 516. As shown in FIG. 10, the distribution and/or control system input/output 1006 may also receive signals. These signals may be transmitted through passive splitter 1004 to the card reader via the card reader input/output 1002 channel.

A second output from the passive splitter 1004 may be coupled with a processor 1006. The processor may be configured to perform one or more of the processes described above based on the signal received by the card reader input/output 1002. In the implementation shown, the processor 1008 is coupled with a memory 1010. The memory 1010 may be configured to store information to support the processes described above. The memory 1010 may be configured to store credit card data received by the card reader input/output 1002. The memory may be configured to store configuration parameters for the transaction monitor 516.

The processor 1008 may be coupled with a power supply 1012. The power supply 1012 may be coupled to a power source 1014 and configured to receive power from the power source 1014 and provide a suitable power level to operate the transaction monitor 516. The power source 1014 may be a power outlet, a solar panel, or other suitable power providing source. In some implementations, the power source 1014 may be included in or formed on the transaction monitor 516. For example, a battery may be included as a power source of the transaction monitor 516. In some implementations, multiple power sources may be included. The processor 1008 may be configured to select a power source. For example the processor 1008 may select between a primary source (e.g., outlet power) and a secondary source (e.g., battery backup) based on the status of a power source.

The processor 1008 may be coupled via one or more wired or wireless connections with a display interface 1016. The display interface 1016 may be configured to transmit and receive data between the transaction monitor 516 and a display as, for example, described above. The data transmitted may include the gender and/or category information determined by the processor 1008 based on the received transaction data. In some implementations, the transmitted data may be a customer profile. Data received from the display may include acknowledgement signals, requests for retransmission of data, or other control signals.

It will be appreciated that the above described system could be used in environments other than gas pumps, with especially advantageous application in any environment where credit card information is collected, and the purchaser has further time to view advertisements prior to transaction completion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web-site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc, or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the disclosure.

While the foregoing is directed to aspects of the present disclosure, other and further aspects of the disclosure may be devised without departing from the basic scope thereof.

What is claimed is:

1. A system for targeting content at a point-of-sale, the system comprising:
    a card reader;
    a point-of-sale system;
    a transaction monitor hardware device, said transaction monitor hardware device being a physically separate device from said card reader and said point-of-sale system, said transaction monitor hardware device being coupled between the card reader and the point-of-sale system, said coupling of said transaction monitor hardware device having an input coupled with the card reader and an output coupled with the point-of-sale system, the transaction monitor hardware device configured to receive transaction information from at least one of the card reader and the point-of-sale system; and
    a transmitter configured to transmit the transaction information to a display for targeted content presentation.

2. The system of claim 1, wherein the transaction information comprises at least one of ZIP code information from customer use of a debit or credit card at the card reader, customer name information from customer use of a debit or credit card at the card reader, an entity issuer identifier derived from customer use of a debit or credit card at the card reader, and information regarding a product located proximate to the debit or credit card reader, the product information including at least one of a price and an amount of product.

3. The system of claim 2, wherein the transaction monitor hardware device is coupled with a distribution and control system, wherein the information regarding the product is received from the distribution and control system.

4. The system of claim 3, the system further comprising a memory, the transaction monitor hardware device configured to store at least a portion of the received transaction information in the memory.

5. The system of claim 1, the system further comprising a processor configured to generate a customer profile based at least in part on the received transaction information, wherein the transmitting the transaction information comprises transmitting the customer profile.

6. The system of claim 1, wherein the transmitter is configured for wireless transmission.

7. The system of claim 1, wherein the transmitter is coupled to the display via a wired connection.

8. The system of claim 1, wherein the transaction monitor hardware device comprises a passive splitter.

* * * * *